C. E. GLASSPOOLE.
QUACK GRASS PLOW.
APPLICATION FILED JULY 23, 1907.
945,734.
Patented Jan. 4, 1910.
3 SHEETS—SHEET 1.
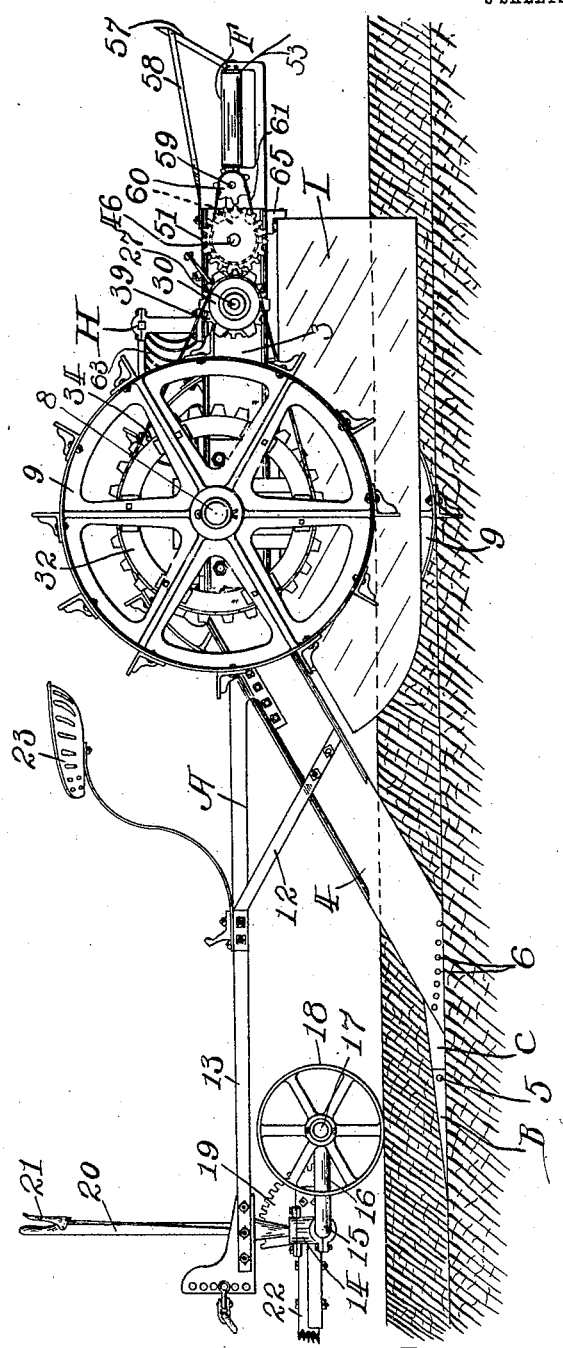

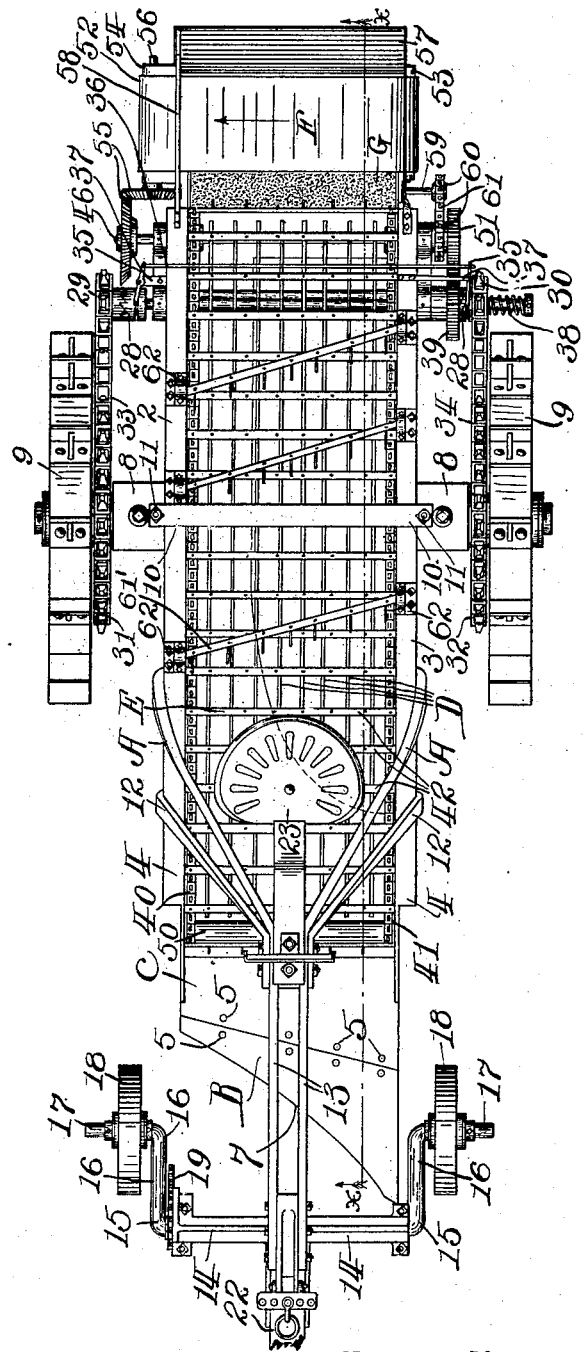

C. E. GLASSPOOLE.
QUACK GRASS PLOW.
APPLICATION FILED JULY 23, 1907.
945,734.
Patented Jan. 4, 1910.
3 SHEETS—SHEET 3.
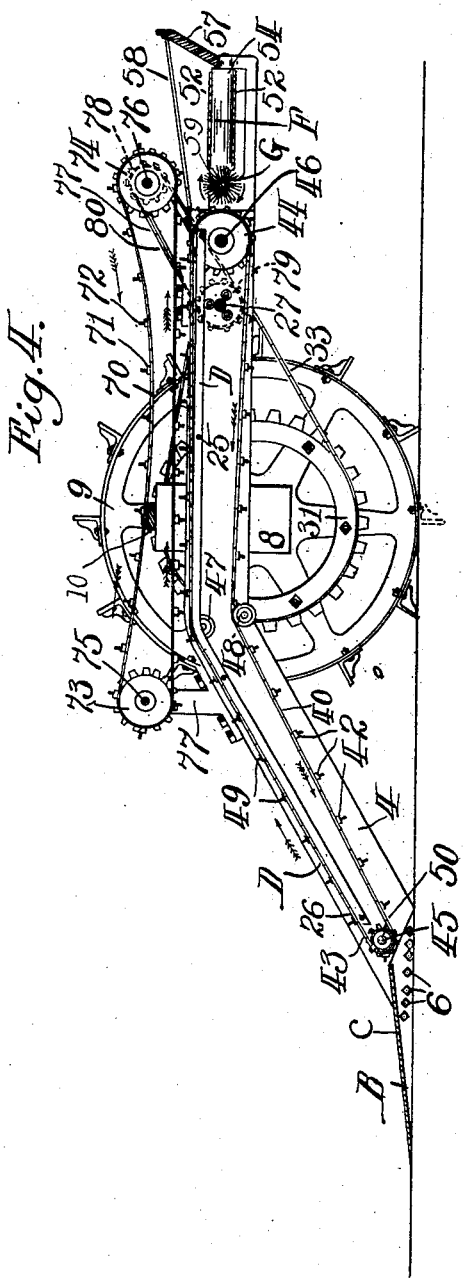
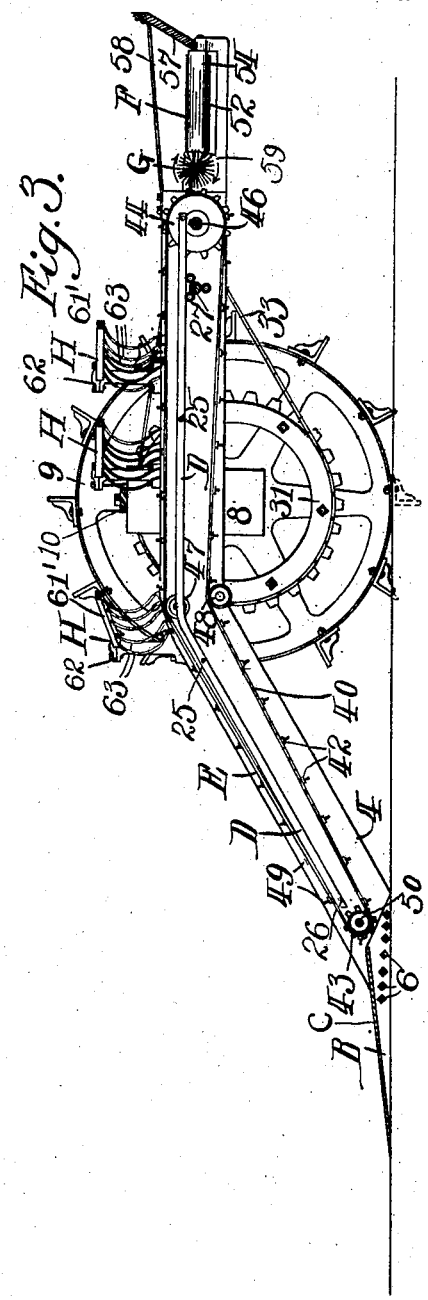
Witnesses:
Inventor:
Charles E. Glasspoole,
by: Attorney.

UNITED STATES PATENT OFFICE.

CHARLES E. GLASSPOOLE, OF ST. PAUL, MINNESOTA.

QUACK-GRASS PLOW.

945,734.  Specification of Letters Patent.  Patented Jan. 4, 1910.

Application filed July 23, 1907. Serial No. 385,204.

*To all whom it may concern:*

Be it known that I, CHARLES E. GLASSPOOLE, a citizen of the United States, residing at St. Paul, in the county of Ramsey and State of Minnesota, have invented a new and useful Improvement in Quack-Grass Plows, of which the following is a specification.

My invention relates to quack grass plows and has for its primary object to entirely remove quack grass from the earth in which it grows.

Heretofore it has usually been customary in the removal of quack grass to cut it as distinguished from removing it by the roots from the soil as in my present invention and it is obvious that the mere cutting does not prevent the grass growing again, but on the other hand causes the roots to spread and tend to choke and kill any other growth in the soil.

Lands in some sections of the country become so choked with quack grass as to render them entirely unproductive and I believe myself to be the first to use a machine which will entirely remove such grass by the roots and thus increase the productiveness of the soil and enhance the value of lands.

Among further objects of my invention are simplicity of construction and greater effectiveness in operation.

By the use of my invention the quack grass is removed, and the soil plowed and mellowed by a single operation.

In the accompanying drawings forming part of this specification, Figure 1 is a side view of my invention; Fig. 2 is a plan view; Fig. 3 is a section of Fig. 2 taken on the line X—X, and Fig. 4 is a sectional view similar to the one illustrated in Fig. 3 showing an alternative construction of my invention.

In a general way my invention comprises a suitable plow coöperating with which are means for breaking or disintegrating the plowed earth and separating the quack grass with its roots from such earth as the machine advances. A machine of this character is adapted to be drawn by horses or driven by other suitable motive power, the parts being carried upon wheels which in turn serve to drive the separating means, although it will be obvious that the parts requiring motion which are carried by the machine may be driven by any suitable actuating mechanism.

In the drawings A represents a suitable frame made of angle iron or any suitable form of constructing material, said frame being provided with a pair of longitudinal side bars 2 and 3 suitably spaced apart. The forward ends 4 of these side bars incline downwardly and forwardly, the rear ends resting substantially horizontally when the machine is in the act of plowing. The forward inclined ends of the frame carry a plow B and mold board C, these parts being secured together by means of rivets 5 and fastened between the side bars by bolts 6 thus serving to tie the forward ends of the bars on the frame together. The plow B is of ordinary construction and is provided with the usual point and an inclined cutting edge 7.

The main portion of the frame of the machine is mounted upon axles 8, which are longitudinally spaced apart. The ends of these axles have gudgeons on which are suitably journaled drive wheels 9 of ordinary construction. A clamp bar 10 which is secured to the axle by means of bolts 11 serves to hold the side bars of the frame on the axle. The forward end of the frame is provided with converging arms 12 which are secured to the reach 13. The forward end of the reach is fastened to a transverse bar 14, to the ends of which is journaled a crank axle 15. The extremities of this axle are bent to form cranks 16 and gudgeons 17. These gudgeons are provided with traction wheels 18 which are journaled thereon. The axle 15 carries a segment 19 and an operating lever 20 on the cross bar 14 is adapted to adjust the height of the forward end of the machine by engaging the teeth of the segment and turning the axle 15 to vary the angle of inclination of the cranks 16. The handle 21 of the lever 20 serves in the usual manner to engage and lock with the teeth of the segment to turn and hold the axle. The forward end of the reach 13 is adapted to carry a pole 22 to which the horses may be attached and its rear end carries a seat 23 for the driver.

Between the sides of the frame are a plurality of longitudinal rack bars D, the forward ends of which incline downwardly and the rear ends rest substantially horizontally. These rack bars are connected by means of transverse tie rods 25 and their forward ends are pivoted at 26 to the frame. The rear ends of the rack bars rest upon a rack shaft 27 which when revolving serves to raise and lower the rear end of the rack bars and to apply a substantially vertical racking movement thereto. The rack shaft is journaled in the frame and connected by a differential clutch 28 on each end to the sprocket pinions 29 and 30. These pinions 29 and 30 are connected with the drive wheels 9 to communicate motion, by means of drive sprocket wheels 31 and 32 which are mounted upon the drive wheels and chains 33 and 34 passing around said sprockets and pinions. The teeth on the engaging members of the clutches 28 are beveled so as to differentiate motion when one of the drive wheels 9 travels faster than the other as in turning a corner. Suitable shift levers 35 are provided for throwing the clutches into and out of operation by hand and are connected by means of a rod 36 so that they are moved simultaneously by a single operation. The levers 35 are fulcrumed upon brackets 37 which are carried upon the frame. A spring 38 on the end of the rack shaft permits the clutches to release and differentiate motion between the wheels. The particular means used for differentiating motion between the wheels and driven parts may be of any suitable construction desired and any suitable differentiating clutch may be applied to this device for accomplishing the results for which such clutches are used. The rack shaft also carries a gear 39 which communicates motion from the transmission mechanism to parts to be hereinafter described.

Located between the side bars of the frame and moving longitudinally therein to elevate and advance the earth from the plow is an apron E comprising a pair of longitudinal link belts 40 and 41 between which are transverse slats 42. These belts pass around pairs of sprocket wheels 43 and 44 respectively at the lower and upper ends of the frame, the lower sprocket wheels being mounted upon a shaft 45 and the upper ones upon a shaft 46. The upper and lower laps of the apron pass around idle sprockets 47 and 48 journaled at or near the angle of the side bars, causing the upper lap of the apron to travel close to the rack bars which oscillate immediately below it. The slats 42 are provided with teeth 49 which with the slats serve to engage the earth and quack grass as it is received from the plow and mold board and to raise and advance them through the machine. The shaft 45 carries a transverse antifriction roller 50 which assists in causing the earth and grass to pass from the mold board onto the apron. Motion is communicated from the rack shaft to the shaft 46 by means of the gear 51 which meshes with the gear 39 and serves to move the apron. At the delivery end of the apron is a transverse conveyer F which has an endless belt 52 traveling around an idle roller 53 journaled on one side of the frame and a drive roller 54 which is journaled upon the other side. This drive roller is actuated by means of intermeshing bevel gears 55, one of which is carried by the shaft 56 of the drive roller and the other by the shaft 46 of the apron. Immediately back of the transverse conveyer is a stop board 57, the lower end of which is mounted upon the frame and the upper end supported by means of brace rods 58 which are attached to it and the sides of the frame.

Interposed between the transverse conveyer and the delivery end of the apron is a cleaning brush G which is carried by the shaft 59 journaled in the frame and revolved by means of sprockets 60 and a belt chain 61 passing around said sprockets, one of said sprockets being mounted upon the shaft 46. The brush revolves in the direction of the arrows indicated in Fig. 3 and serves to clean the teeth of the belt and to convey the quack grass from said belt onto said transverse conveyer from which it is subsequently ejected to one side of the machine.

For the purpose of disintegrating the earth and retarding the progress thereof until it is disintegrated, is provided a series of collectors H above the apron. These collectors comprise transverse supporting bars 61' which are mounted by means of brackets 62 upon the sides of the frame in an inclined direction as compared with the transverse slats of the apron as shown. Each of these supporting bars carries a plurality of depending spring teeth 63 which serve to retard the progress of the grass until all of the earth has been disintegrated by the racking bars from its roots and cause the grass to move toward the rear of the machine in a continuous mass. These collectors produce efficient results for little or no earth reaches the delivery end of the apron and the quack grass is ejected from the machine in a compact mass upon the transverse conveyer.

Depending below the frame of the machine is a deflector I in the form of an inclined board which is held upon the frame by means of suitable supports such as indicated by 65. This deflector travels back of the plow and mold board and prevents the earth from entirely closing the furrow, leaving a narrow pathway for the inner wheel to travel below the surface of the ground.

In operation, the front end of the machine is lowered so that the point of the plow impinges in the ground at the desired depth by means of the handle 20. As the machine advances the earth is plowed up upon the mold board from which it advances over the roller 50 upon the apron. The apron carries the earth and quack grass onto the rack bars which serve to disintegrate the earth and loosen the roots of the quack grass. The collectors above the belt press the quack grass down upon the apron and the earth upon the rack bars, thus assisting in breaking the earth away from the roots of the quack grass. The angle of inclination of the collector teeth and their resiliency permit the quack grass to be carried by the apron until it egresses upon the transverse conveyer F which delivers the quack grass upon the ground at one side of the machine. The cleaning brush G assists in transferring the quack grass from the apron upon the transverse conveyer and also cleans the teeth of the apron. The earth is thus disintegrated and separated from the roots of the quack grass by the collectors and rack bars and falls below the frame of the machine upon the ground. The deflector holds the disintegrated earth on one side of the furrow groove, thus leaving a path for the inner wheel of the machine to travel below the surface of the ground. When it is not desired to plow by the machine the front end of the frame is raised by the lever 20 and the plow travels above the surface of the ground upon its wheels.

In the alternative construction shown in Fig. 4 the collectors are movable and consist of a carrier belt 70 having transverse slats 71 with teeth 72 depending from them. This carrier belt travels around pairs of sprockets 73 and 74 which are mounted upon shafts 75 and 76, the latter being journaled upon suitable supports 77 on the frame. The shaft 76 is driven in the direction of the arrows shown in Fig. 4 at a surface speed less than the surface speed of the apron E of the machine by means of a sprocket 78 on the shaft 76, a drive sprocket 79 on the rack shaft 27, and a chain 80 traveling around the sprockets 78 and 79. In this manner the earth is broken by the teeth of the apron and collectors and the quack grass removed upon the transverse conveyer.

In accordance with the patent statutes, I have described the principle of operation of my invention, together with the apparatus which I now consider to represent the best embodiment thereof, but I desire to have it understood that the apparatus shown is only illustrative and that the invention can be carried out by other means and applied to uses other than those above set forth, within the scope of the following claims.

Having described my invention, what I claim as new and desire to protect by Letters Patent, is:—

1. A quack grass plow comprising, in combination, a frame, a plow carried by said frame, an apron back of said plow, racking mechanism co-acting with said apron, a rigid transverse support, collectors carried by said support having spring teeth depending toward the upper lap of said apron, and actuating mechanism; whereby, the plowed earth is raised on to said apron, the earth and grass are pressed down against the apron until all of the earth upon the roots has been disintegrated, and the grass and roots thereof are forced past said collectors and ejected.

2. A quack grass plow, comprising, in combination, a frame having a substantially horizontal portion and a downwardly inclined forward portion, a plow carried by said frame near its forward extremity, an apron conforming substantially to said frame back of said plow, racking mechanism co-acting with said apron, a series of collectors above the upper portion of said apron acting to press the earth and grass from the plow down against the upper portion of said apron until the earth is disintegrated by said racking mechanism, said apron being adapted to carry the grass past said collectors, and means for ejecting the grass from the machine after it is carried away from said collectors by said apron.

In testimony whereof, I have signed my name to this specification, in the presence of two subscribing witnesses.

CHARLES E. GLASSPOOLE.

Witnesses:
   J. W. DAHLGREN,
   H. L. FISCHER.